(12) United States Patent
Wang

(10) Patent No.: US 8,769,597 B2
(45) Date of Patent: Jul. 1, 2014

(54) AMPLIFIER WITH NOISE REDUCTION

(75) Inventor: Jon-En Wang, Chandler, AZ (US)

(73) Assignee: PCT International, Inc., Mesa, AZ (US)

( * ) Notice: Subject to any disclaimer, the term of this patent is extended or adjusted under 35 U.S.C. 154(b) by 599 days.

(21) Appl. No.: 12/778,941

(22) Filed: May 12, 2010

(65) Prior Publication Data
US 2010/0223651 A1 Sep. 2, 2010

Related U.S. Application Data

(63) Continuation-in-part of application No. 12/487,367, filed on Jun. 18, 2009, now abandoned.

(60) Provisional application No. 61/074,898, filed on Jun. 23, 2008.

(51) Int. Cl.
H04N 7/173 (2011.01)

(52) U.S. Cl.
USPC ............ 725/127; 725/125; 725/126; 725/128

(58) Field of Classification Search
None
See application file for complete search history.

(56) References Cited

U.S. PATENT DOCUMENTS

| 5,016,244 | A | | 5/1991 | Massey, Jr. et al. |
| 5,696,895 | A | | 12/1997 | Hemphill et al. |
| 5,724,344 | A | | 3/1998 | Beck |
| 5,815,794 | A | * | 9/1998 | Williams ...................... 725/125 |
| 5,826,167 | A | | 10/1998 | Jelinek et al. |
| 6,075,784 | A | | 6/2000 | Frankel et al. |
| 6,094,211 | A | | 7/2000 | Baran et al. |
| H1858 | H | | 9/2000 | Ibelings |
| 6,175,565 | B1 | | 1/2001 | McKinnon et al. |
| 6,202,169 | B1 | | 3/2001 | Razzaghe-Ashrafi et al. |
| 6,348,837 | B1 | | 2/2002 | Ibelings |
| 6,373,817 | B1 | | 4/2002 | Kung et al. |

(Continued)

FOREIGN PATENT DOCUMENTS

| JP | 2004080483 A | 3/2004 |
| JP | 2005005875 A | 1/2005 |

(Continued)

OTHER PUBLICATIONS

Bi-directional amplifiers by the Twister Group, 3 pages printed Jul. 9, 2008, http://www.thewistergroup.com/category/new-arrivals-pico-macom.html.

(Continued)

Primary Examiner — Cai Chen
(74) Attorney, Agent, or Firm — Perkins Coie LLP

(57) ABSTRACT

The present invention helps eliminate ingress noise addition (i.e., the "noise funneling effect" for an HFC coaxial plant). A system according to various aspects of the present invention comprises a switch that includes: (i) a first state for allowing passage of a signal therethrough; and (ii) a second state for preventing passage of the signal therethrough. The system further includes a detection circuit in communication with the switch. The detection circuit is configured to: (i) detect whether the signal includes an amplitude of at least a predetermined level; (ii) operate the switch to the first state if the amplitude of the signal is at least the predetermined level; and (iii) operate the switch to the second state if the amplitude of the signal is less than the predetermined level, wherein operation of the switch to the second state is delayed by a predetermined period of time.

12 Claims, 4 Drawing Sheets

(56) References Cited

U.S. PATENT DOCUMENTS

| | | |
|---|---|---|
| 6,477,197 B1 | 11/2002 | Unger |
| 6,640,239 B1 | 10/2003 | Gidwani |
| 6,671,253 B1 | 12/2003 | Alexander, Jr. et al. |
| 6,681,100 B1 | 1/2004 | Ge |
| 6,690,789 B1 | 2/2004 | Hamilton |
| 6,735,302 B1 | 5/2004 | Caine et al. |
| 6,757,910 B1* | 6/2004 | Bianu .................. 725/125 |
| 6,785,907 B1 | 8/2004 | Dan et al. |
| 6,788,169 B1 | 9/2004 | Schemmann et al. |
| 6,839,829 B1 | 1/2005 | Daruwalla et al. |
| 6,993,286 B2 | 1/2006 | Zhen et al. |
| 7,093,054 B1 | 8/2006 | Goldman |
| 7,254,827 B1 | 8/2007 | Terreault |
| 7,530,091 B2 | 5/2009 | Vaughan |
| 7,675,843 B2 | 3/2010 | Geile |
| 7,707,615 B2* | 4/2010 | Musser et al. .................. 725/107 |
| 2002/0010817 A1 | 1/2002 | Yeh |
| 2002/0083476 A1 | 6/2002 | McNamara |
| 2002/0101818 A1 | 8/2002 | Teixeira |
| 2003/0014765 A1 | 1/2003 | Ljungdahl et al. |
| 2003/0066082 A1 | 4/2003 | Kliger et al. |
| 2003/0121056 A1* | 6/2003 | Sorenson et al. ............ 725/125 |
| 2003/0214939 A1 | 11/2003 | Eldumiati et al. |
| 2004/0027992 A1 | 2/2004 | Volkening et al. |
| 2004/0170160 A1 | 9/2004 | Li et al. |
| 2005/0026571 A1 | 2/2005 | Yang et al. |
| 2005/0169056 A1 | 8/2005 | Berkman et al. |
| 2006/0035602 A1 | 2/2006 | Young et al. |
| 2006/0063508 A1 | 3/2006 | He et al. |
| 2006/0205442 A1 | 9/2006 | Phillips et al. |
| 2006/0248567 A1 | 11/2006 | Vanderhoff et al. |
| 2009/0098831 A1 | 4/2009 | Deng et al. |
| 2009/0320085 A1 | 12/2009 | Wang |
| 2010/0095344 A1 | 4/2010 | Newby et al. |
| 2010/0223651 A1 | 9/2010 | Wang |

FOREIGN PATENT DOCUMENTS

| | | |
|---|---|---|
| WO | WO-9608925 A1 | 3/1996 |
| WO | WO-03056728 A1 | 7/2003 |
| WO | WO2011/142940 | 11/2011 |

OTHER PUBLICATIONS

Dual direction transmission diplex drop amplifier by Alibaba.com, 2 pages pritned Jul. 9, 2008, http://www.alibaba.com/catalog/20591299/Diplex_Drop_Amplifier.html.

Non-Final Office Action U.S. Appl. No. 12/487,367 Mailed on Sep. 2, 2011, Applicant Jon-En Wang, 10 pages.

International Search Report and Written Opinion; International Patent Application No. PCT/US2011/033086; Filed: Apr. 19, 2011; Applicant: PCT International, Inc.; Mailed on Jul. 27, 2011.

"Clipcomm CP-IOOP," VOIPSupply.com http://www.voipsupply.conn/product_info.php?products_id=305, 2 pages printed from Internet Jun. 6, 2005.

* cited by examiner

AMPLIFIER WITH NOISE REDUCTION

CROSS-REFERENCE TO RELATED APPLICATIONS

This application is a continuation-in-part of, and claims priority to, U.S. patent application Ser. No. 12/487,367 filed Jun. 18, 2009, now abandoned which claims priority to U.S. Provisional Patent Application Ser. No. 61/074,898, filed Jun. 23, 2008, the disclosures of which are incorporated by reference in their entirety.

DESCRIPTION OF THE INVENTION

1. Field of the Invention

The present invention relates to amplifiers with noise reduction. More particularly, the present invention helps improve return path signal quality of video, voice, and data communications in a CATV (cable television) network such as HFC (Hybrid Fiber-Coaxial) network architectures used by CATV service providers, thereby allowing for longer transmission distances, higher signal modulation formats in the order of higher order of M-QAMs (Multi-level Quadrature Amplitude Modulations), and higher network reliability.

2. Background of the Invention

In recent years, CATV operators have expanded from being entertainment providers to being also broadband providers and then voice service providers. Modern communications networks must provide increasing amounts of bandwidth as subscriber demands grow, especially as Internet applications such as file sharing, video conferencing, ecommerce, and consumer video production become more popular. To address this issue, many ILECs (Incumbent Local Exchange Carriers) and CLECs (Competitive Local Exchange Carriers) have completely rebuilt their networks using fiber-based technologies such as GPONs (Gigabit Passive Optical Networks). Such infrastructure modifications are, however, both time-consuming and expensive.

Operators have also attempted to satisfy the ever-increasing demand for bandwidth in other ways. For example, some operators have implemented higher modulation schemes for both forward path (downstream) and return path (upstream) signals. Currently, many CATV operators use 256 QAM (Quadrature Amplitude Modulation) for downstream signals, and are actively migrating from 16 QAM to 64 QAM for upstream return path signals.

However, as higher levels of modulation are used, the required signal to noise ratio (signal quality) increases. This means that the "good" (i.e., valid) signals originating from cable modems, EMTAs (Embedded Multimedia Terminal Adapters) and cable settop boxes must be at a sufficient power level above unwanted interfering noise to ensure good data transmission quality. Furthermore, the HFC network must provide a guaranteed level of service to ensure the quality of voice communications and accommodate the increasingly-popular use of EMTAs for VoIP (Voice over Internet Protocol).

Many unwanted noise signals enter an HFC plant from the homes of subscribers. Such noise can be caused by any combination of sources, including unterminated coaxial F-ports; bad shielding of televisions, VCRs, or cable boxes; and low quality RF amplifiers with either bad shielding, self oscillations, return loss, or distortions which all combine to allow ingress of noise.

HFC networks employ the DOCSIS (Data Over Cable Service Interface Specification) standard for bi-directional data transmission. The DOCSIS cable modem and EMTA in the home of a subscriber transmits return path data in bursts. This means that when not actively transmitting data, the cable modem is inactive. Cable settop boxes also use a burst mode transmission pattern, sending return path signals only, for example, when the home user orders a particular movie from the VOD or PPV service. However, despite of the burst nature of return path signals, present HFC plant design provides for a return signal path that is always open, so that ingress noise is transmitted even though no active transmission is taking place.

FIG. 1 illustrates ingress noise from multiple subscriber homes adding together, creating a "noise funneling effect" at the HFC plant. This "noise funneling" negatively impacts the SNR (signal to noise ratio) of the system and effectively sets the limit on the number of homes per node, as well as the highest modulation level that can be used. Conventional attempts by CATV operators to reduce ingress noise so that higher modulation levels can be used include reducing node sizes, which requires expensive HFC plant upgrades consisting of new optical fiber deployment and capital equipment investment. The present invention addresses these and other issues.

SUMMARY OF THE INVENTION

The present invention helps eliminate ingress noise addition (i.e., the "noise funneling effect" for an HFC coaxial plant). A system according to various aspects of the present invention comprises a switch that includes: (i) a first state for allowing passage of a signal therethrough; and (ii) a second state for preventing passage of the signal therethrough. The system further includes a detection circuit in communication with the switch. The detection circuit is configured to: (i) detect whether the signal includes an amplitude of at least a predetermined level; (ii) operate the switch to the first state if the amplitude of the signal is at least the predetermined level; and (iii) operate the switch to the second state if the amplitude of the signal is less than the predetermined level, wherein operation of the switch to the second state is delayed by a predetermined period of time.

Both the foregoing summary and the following detailed description are exemplary and explanatory only and are not restrictive of the invention.

BRIEF DESCRIPTION OF THE DRAWINGS

A more complete understanding of the present invention may be derived by referring to the detailed description and claims when considered in connection with the following illustrative figures.

DETAILED DESCRIPTION OF EXEMPLARY EMBODIMENTS

Figure 1:
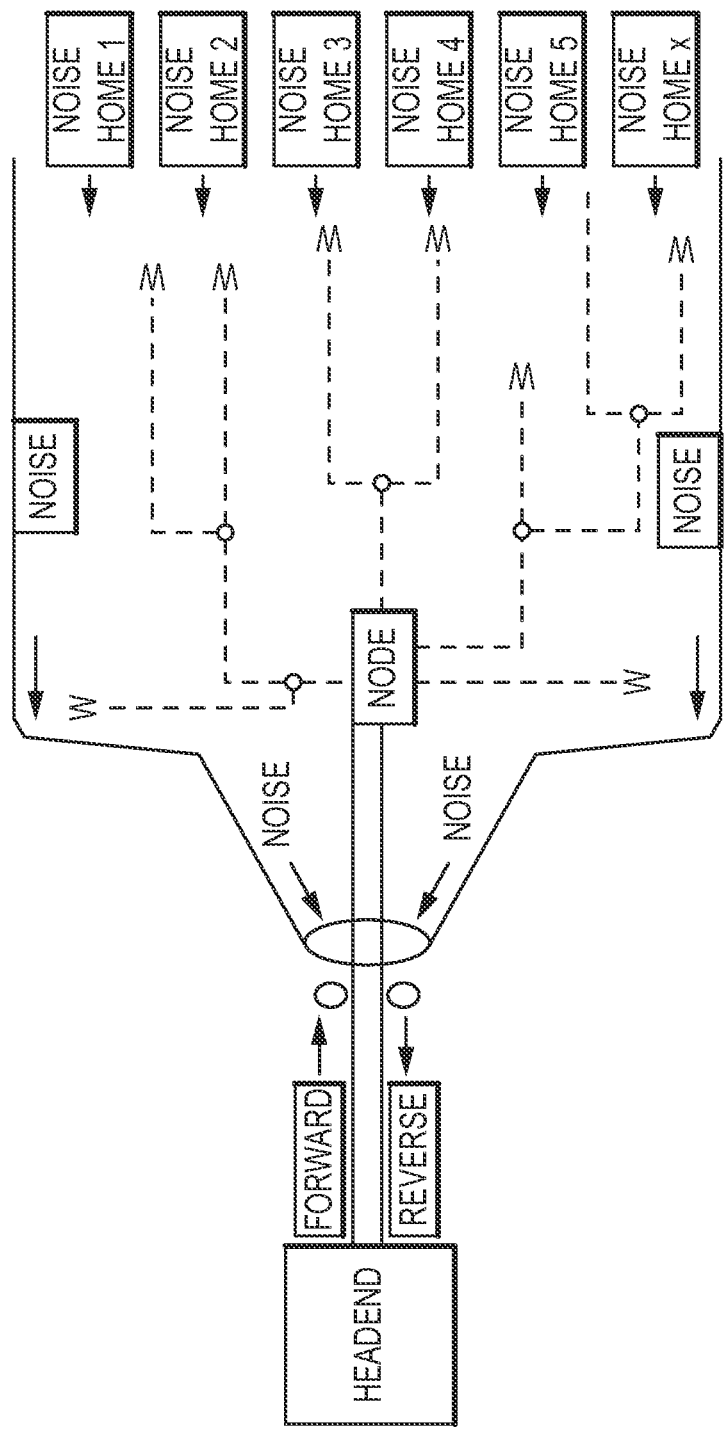
FIG. 1 is a block diagram showing "noise funneling" in the return path of a conventional HFC plant.
Figure 2A:
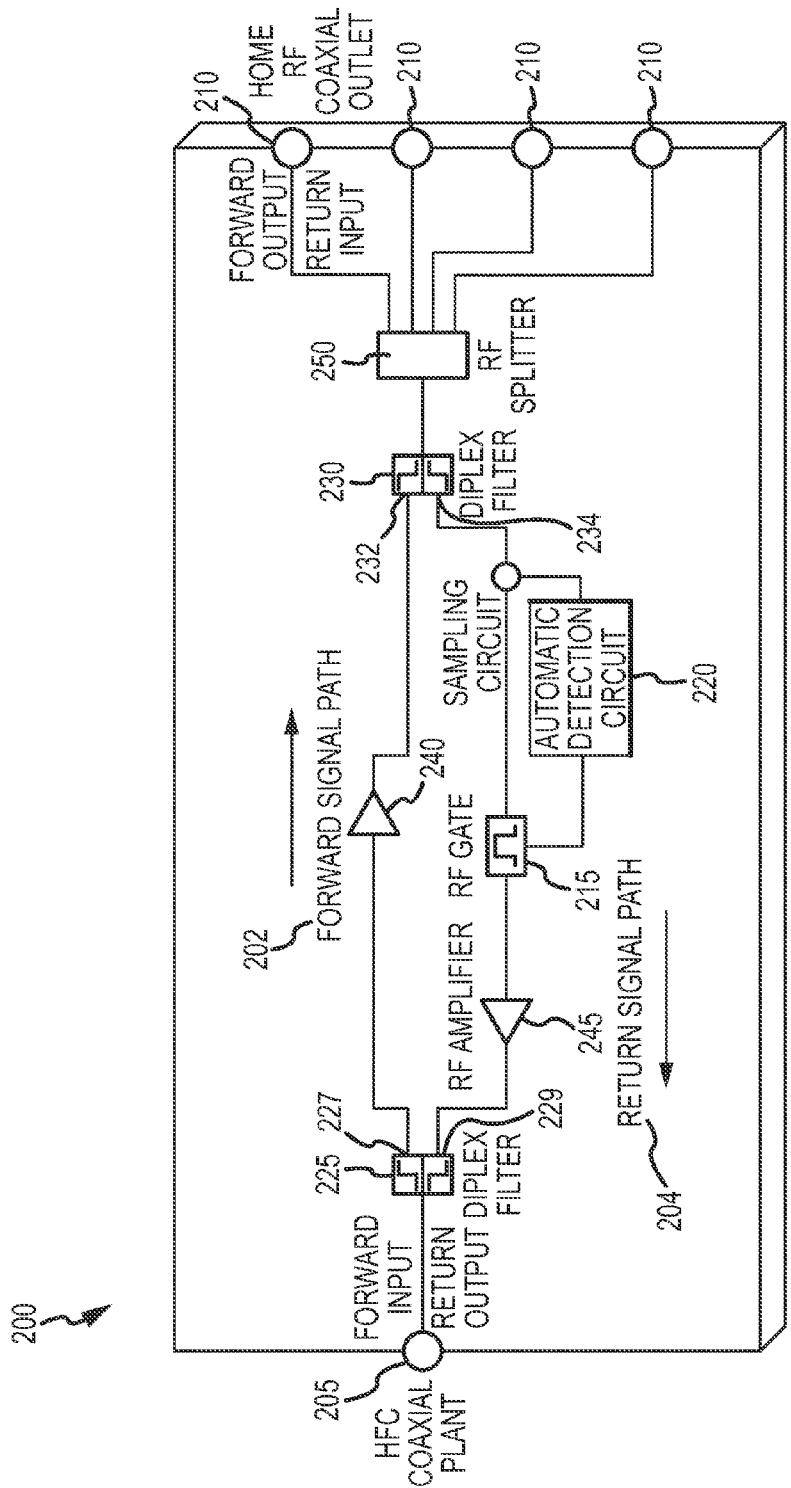
FIG. 2A is a block diagram depicting an exemplary amplifier system according to various aspects of the present invention.

An exemplary amplifier system according to various aspects of the present invention is depicted in FIG. 2A. In this embodiment, system 200 includes at least one first interface 205 for connecting to an HFC plant, headend, or other source that generates signals for distribution to one or more subscribers. Subscribers, in turn, interface with the amplifier through one or more second interfaces 210. Signals received at the first interface 205 (e.g., from the HFC plant or headend) are transmitted along the forward signal path 202 and are provided to a subscriber via the second interface 210. Signals received at the second interface (e.g., from a subscriber's cable modem or other device) are transmitted along the return signal path 204 and provided (e.g., to the HFC plant or headend) via the first interface 205. When a return path RF signal enters the system 200 through the second interfaced 210, it is routed by the second diplex filter 234 along the return signal path 204 and a portion of the return RF signal is routed to the detection circuit 220, the operation of which is described in more detail below.

Alternate embodiments of systems of the present invention may include any desired number of first interfaces 205 and second interfaces 210. The present invention may be utilized implemented as a house amplifier (also referred to as a drop amplifier, RF amplifier, and/or CATV amplifier) installed on the side of a subscriber's house or other building, as well as in a garage or basement.

The exemplary system 200 depicted in FIG. 2A further includes a first diplex filter 225 (also known as a "diplexer") coupled to the first interface 205. The first diplex filter 225 includes a forward signal port 227 for directing signals received at the first interface 205 along the forward signal path 202, and a return signal port 229 for directing signals from the return signal path 204 to the first interface 205. Similarly, a second diplex filter 230 includes a forward signal port for directing signals from the forward signal path 202 to the one or more second interfaces 210 (e.g., via RF splitter 250), and a return signal port 232 for directing signals received at the one or more second interfaces along the return signal path 204. Any suitable diplex filter may be used in conjunction with the present invention.

The system 200 includes a forward signal amplifier 240 coupled between the first diplex filter 225 and second diplex filter 230, while a return signal amplifier 245 is coupled between the first diplex filter and switch 215. The forward signal amplifier 240 and return signal amplifier 245 are used to help ensure that the forward signal and return signal, respectively, have an appropriate amplitude level. Any number and type of amplifiers, filters, regulators, and/or other devices may be used along the forward signal path 202 and/or return signal path 204 to adjust signals along the respective paths as desired. The present invention may include active and/or passive forward path amplification, as well as active and/or passive return path amplification.

Figure 2B:
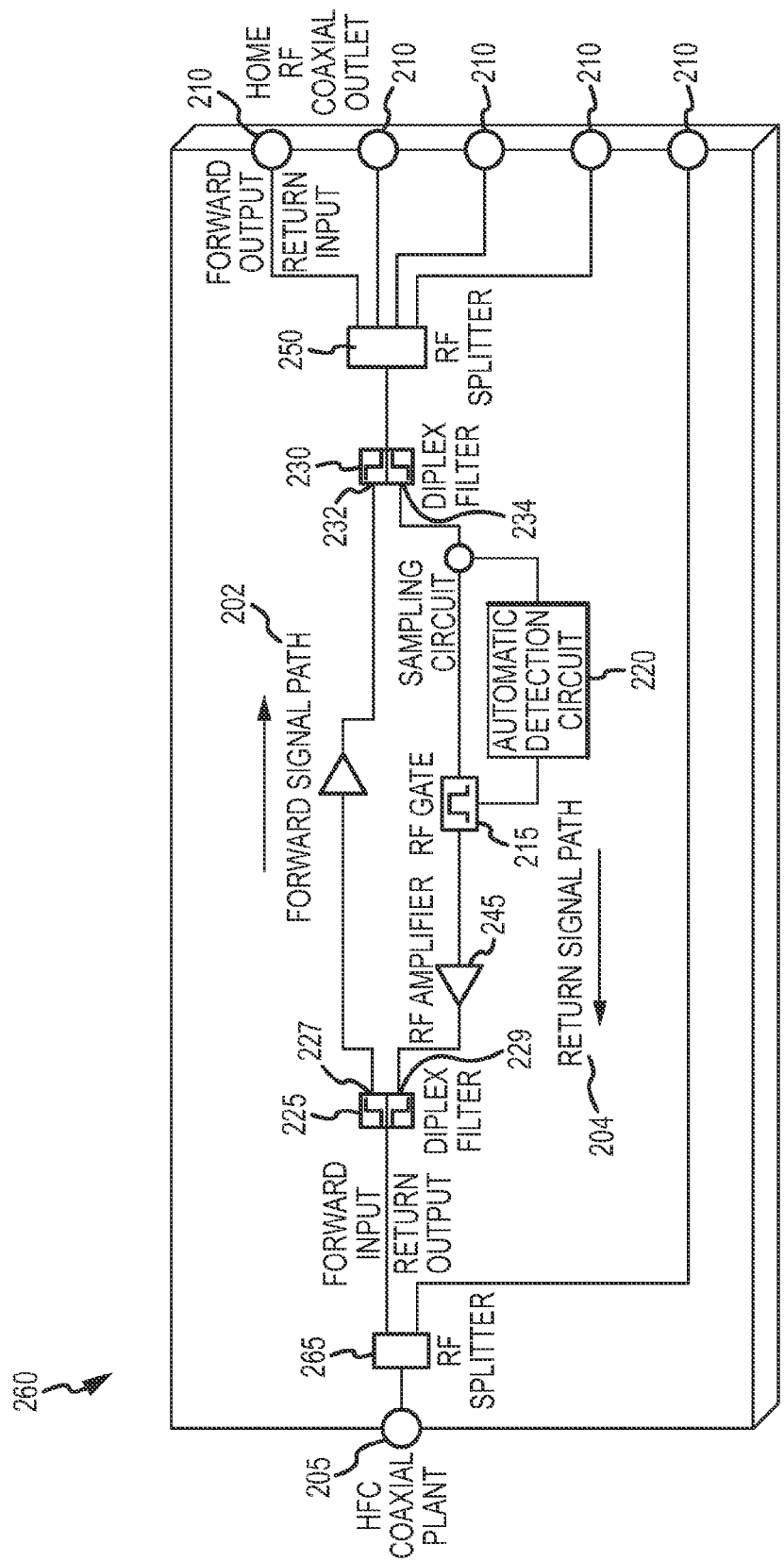
FIG. 2B is a block diagram depicting another exemplary amplifier system according to various aspects of the present invention.

The system 200 includes an RF splitter 250 coupled between the second diplex filter 230 and the one or more second interfaces 210. In this exemplary embodiment, the RF splitter 250 includes four ports, each port coupled to a respective one of the second interfaces 210. Systems of the present invention may include any number and type of splitters, and such splitters may include any desired number of ports. In another embodiment of the present invention for example, referring now to FIG. 2B, system 260 is in all respects the same as system 200 with the exception of an additional (bottom-most) second interface 210 coupled to a second RF splitter 265, which is in turn coupled between the first interface 205 and the first diplex filter 225. The second splitter 265 includes a first port coupled to the first diplex filter 225, with a second port coupled to the bottom-most second interface 210. Among other things, the second splitter 265 allows for the bypass of the detection circuit 220 for a subscriber device (i.e., connected to the bottom interface 210 in this example) that is in frequent or constant communication with an HFC plant or headend via the first interface 205, such as a cable modem. The second splitter 265 may include any number of desired ports connected to a second interface 210 to bypass the detection circuit 220 and switch 215. As with the forward signal path 202 and return signal path 204, a direct connection between a second interface 210 and splitter 265 may include any number and type of amplifiers, filters, regulators, and/or other devices.

The system 200 includes a detection circuit 220 in communication with a switch 215 along the return signal path 204. In a first state, switch 215 allows passage of signals therethrough (i.e., the switch is "on") while the switch prevents the passage of signals in a second state (i.e., the switch is "off"). In the exemplary embodiment depicted in FIG. 2A, the switch 215 is an RF gate. Any other suitable type of switch may be used in conjunction with the present invention, including an RF switch, voltage-controlled variable attenuator, and/or other device. For example, an RF switch may be used for complete on/off control, while a voltage controlled attenuator can be employed to allow for full on, partial off control.

As described in more detail below, when no RF signal (i.e., only ingress noise) is present along the return signal path 204, the detection circuit 220 operates the switch 215 to the second (i.e., "off") state such that ingress noise from one or more subscribers connected to the second interface(s) 210 does not enter the HFC coaxial plant or headend via the first interface 205.

The detection circuit 220 is used to operate the switch 215 between allowing (in the first state) and preventing (in the second state) passage of signals along the return signal path 204. If the amplitude of the RF return signal is at or above a predetermined threshold, the detection circuit 220 will turn on the switch 215 (after a predetermined delay) allowing RF return signal to pass through.

Figure 3:
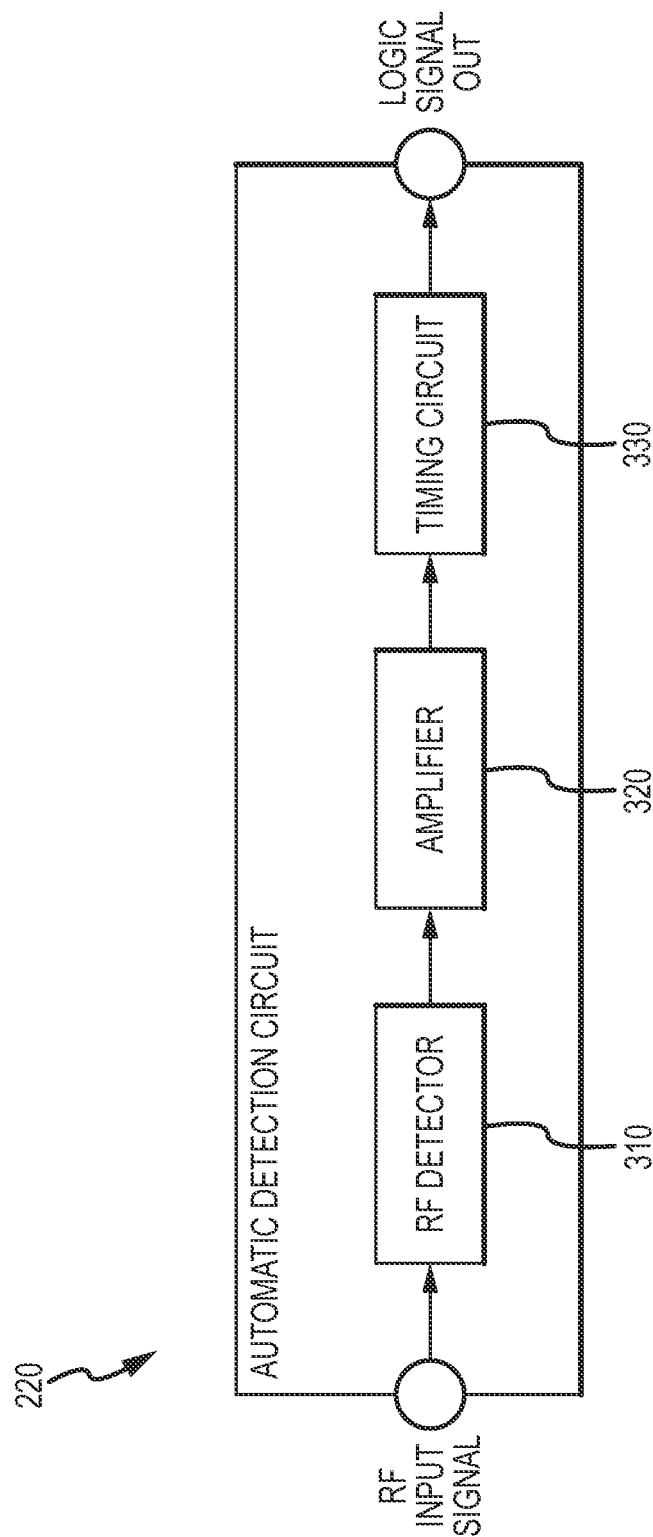
FIG. 3 is a block diagram depicting an exemplary detection circuit in accordance with various aspects of the present invention.

An exemplary detection circuit 220 is illustrated in FIG. 3. In this exemplary embodiment, an RF detector 310 detects whether signals received at the second interface (i.e., RF return path signals from a subscriber's cable modem, eMTA, settop box and/or other device) includes an amplitude of at least a predetermined level. In this exemplary embodiment, the RF detector 310 demodulates the RF return path signal and provides the demodulated signal indicative of a voltage output level corresponding to the RF signal power of the return path signal. The amplifier 320 further amplifies the voltage output level from the RF detector 310 so that "on" or "off" conditions can be detected using standard logic components. For example, CMOS or TTL logic can be used depending on the gain of the amplifier, which can be implemented simply using operational amplifiers and feedback gain control. The timing circuit 330 is configured to delay, by a predetermined amount of time, operation of the switch 215 to the second state. The timing circuit 330 may be configured to delay operation of the switch 215 by any suitable amount of time for any suitable purpose. For example, the delay may be selected to avoid a loss of data due to the premature operation of the switch 215 to the second state. In other words, the timing circuit 330 enables the switch 215 to be operated to the first ("on") state quickly, while operation of the switch to the second ("off") state is delayed to ensure all signals pass through before the switch 215 is shut off.

Among other things, the detection circuit 220 of the present invention provides for the automatic operation of the switch 215. In previous implementations of devices for troubleshooting return path ingress noise issues, a switch (e.g., an RF gate) is turned on or off by a user through remote signaling. A device employing such a remote-controlled switch (also known as a "wink switch") is described in U.S. Patent App. No. 2008/0320541 to Zinevich. However, this approach can only be used for troubleshooting, where an attempt is made to identify sources of ingress noise. This approach has a number of limitation, including: (a) only an identification of the source of noise can be made, without providing an improvement in the level of ingress noise during normal operation; (b) accurate detection or identification of the source of noise may not even be possible due to the transient nature of certain ingress noise sources; (c) direct manipulation of the switch is required of a human operator; (d) network availability is interrupted during the troubleshooting; and (e) a reduction of the noise may not even be possible, especially when the ingress noise originates from within a customer's home.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:
1. A system comprising:
 (a) a switch including:
  (i) a first state for allowing passage of a signal therethrough; and
  (ii) a second state for preventing passage of the signal therethrough; and
 (b) a detection circuit in communication with the switch, the detection circuit configured to:
  (i) detect whether the signal includes an amplitude of at least a predetermined level;
  (ii) operate the switch to the first state if the amplitude of the signal is at least the predetermined level; and
  (iii) operate the switch to the second state if the amplitude of the signal is less than the predetermined level, wherein operation of the switch to the second state is delayed by a predetermined period of time,
 wherein the system is a noise reduction system positionable between a cable television services provider and a cable television services recipient,
 wherein the switch is configured to attenuate noise transmitted from the cable television services recipient to the cable television services provider,
 wherein the detection circuit is in communication with the switch to selectively operate the switch between the first and second states,
 wherein said detect includes demodulate and amplify a return signal from the cable television services recipient to the cable television services provider,
 wherein the predetermined period is a second predetermined period and said detect includes transmit the demodulated and amplified return signal into a timer circuit to delay operation of the switch to the second state by the second predetermined period or to delay operation of the switch to the first state by a first predetermined period,
 wherein the first predetermined period is shorter than the second predetermined period.

2. The system of claim 1, wherein the detection circuit comprises a radio frequency detector for detecting the amplitude of the signal.

3. The system of claim 2, wherein the detection circuit further comprises an amplifier in communication with the radio frequency detector, the amplifier for amplifying the signal.

4. The system of claim 1, wherein the second predetermined period of time is selected to avoid a loss of data due to a premature operation of the switch to the second state.

5. The system of claim 1, wherein the switch includes one or more of:
 a radio frequency gate;
 a radio frequency switch;
 a voltage-controlled variable attenuator; and
 combinations thereof.

6. The system of claim 1, wherein the signal is a return signal, the system further comprising:
 (a) a first interface for receiving a forward signal and providing the return signal; and
 (b) a second interface for providing the forward signal and receiving the return signal.

7. The system of claim 6, further comprising a first diplex filter coupled to the first interface, the first diplex filter including:
 (a) a forward signal port; and
 (b) a return signal port in communication with the switch.

8. The system of claim 7, further comprising a second diplex filter coupled to the second interface, the second diplex filter including:
 (a) a forward signal port; and
 (b) a return signal port in communication with the switch.

9. The system of claim 8, further comprising a forward signal amplifier coupled to the forward signal port of the first diplex filter and the forward signal port of the second diplex filter.

10. The system of claim 8, further comprising a return signal amplifier coupled to the return signal port of the first diplex filter and the switch.

11. The system of claim 8, further comprising:
 (a) a plurality of second interfaces;
 (b) a radio frequency splitter coupled to the second diplex filter, the radio frequency splitter including a port coupled to a respective one of each of the plurality of second interfaces.

12. The system of claim 11, further comprising:
 (a) a second radio frequency splitter coupled to the first interface, the second radio frequency splitter including:
  (i) a first port coupled to the first diplex filter; and
  (ii) a second port coupled to one or more of the second interfaces.

* * * * *